(12) United States Patent
Holmberg et al.

(10) Patent No.: US 6,457,145 B1
(45) Date of Patent: Sep. 24, 2002

(54) FAULT DETECTION IN DIGITAL SYSTEM

(75) Inventors: Per Anders Holmberg; Dan Olov Halvarsson, both of Stockholm; Tomas Jonsson, Södertälje, all of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/354,988

(22) Filed: Jul. 16, 1999

(30) Foreign Application Priority Data

Jul. 16, 1998 (SE) .............................................. 9802559

(51) Int. Cl.[7] .................................................. H02H 3/05
(52) U.S. Cl. ......................................... 714/45; 714/732
(58) Field of Search .............................. 714/45, 30, 48, 714/732, 733

(56) References Cited

U.S. PATENT DOCUMENTS

| | | | |
|---|---|---|---|
| 4,601,034 A | * | 7/1986 | Sridhar ........................ 714/718 |
| 5,051,996 A | | 9/1991 | Bergeson et al. |
| 5,230,000 A | * | 7/1993 | Mozingo et al. ............. 714/732 |
| 5,255,208 A | | 10/1993 | Thakore et al. |
| 5,442,643 A | | 8/1995 | Adachi |
| 5,475,694 A | | 12/1995 | Ivanov et al. |
| 5,525,971 A | | 6/1996 | Flynn |
| 5,544,174 A | | 8/1996 | Abend |
| 5,600,788 A | | 2/1997 | Lofgren et al. |
| 5,638,383 A | | 6/1997 | Wotzak et al. |
| 5,671,233 A | | 9/1997 | Kamada |

FOREIGN PATENT DOCUMENTS

| | | |
|---|---|---|
| EP | 0 631 235 | 12/1994 |
| EP | 0 733 910 | 9/1996 |

OTHER PUBLICATIONS

Abramovici et al., "Digital Testing and Testable Design" *Computer Science Press,* pp. 432–448.

* cited by examiner

*Primary Examiner*—Dieu-Minh Le
(74) *Attorney, Agent, or Firm*—Burns, Doane, Swecker & Mathis, L.L.P.

(57) ABSTRACT

For fault testing in a digital system, a processor unit is made available from other activities and the logical units to be tested are set to a predetermined state. An output response analyze is activated and the processor unit generates a set of stimuli, influencing the appropriate logical units. The output response analyzer collects responses to the stimuli at different nodes in the digital system and creates signatures from them. The signals are verified and if a fault is noticed, this error is noticed. The present state of the processor and other logical units are stored in a storage device prior to the test and recovered after the testing is finished. This fault testing can be performed both at chip and board levels, and on systems with several units.

19 Claims, 8 Drawing Sheets

FAULT DETECTION IN DIGITAL SYSTEM

The present invention relates in general to fault detection in digital systems, and more specifically to fault detection based on signature analysis during operational conditions.

BACKGROUND

In complex electronic systems, such as telephone switches and mainframe computers, fault detection and fault localization have become important parts for ensuring a problem free operation. Fault detection and localization can be employed at different stages in the "life" of a digital system. First, components, chips and boards are checked after production or before installation in a complex system, in order to remove defective units. An example of such a solution can be found in e.g. U.S. Pat. No. 5,544,174. After installation, the whole unit or system may also be thoroughly checked, in order to eliminate e.g. erroneous connections. Such solutions are e.g. disclosed in U.S. Pat. Nos. 5,600,788, 5,671,233, 5,442,643 and EP 0 733 910 A1.

After taking the unit or system in operation, fault may occur at every instant, and to ensure a safe operation, the system has to be checked for faults intermittently. In many complex digital systems, a safe fault detection and the localization of the fault to a specific replaceable plugin unit, is requested. The defective part may easily be replaced and the system may come into operation within a very short period of time. The defective part may then be checked in more detail, in order to determine if it can be repaired and reused, or if it has to be wasted. There is obviously a need for background fault detection tests, during or intermitently during the normal operation of a complex digital system.

According to the state of the art, hardware fault detection can be employed in four fundamental different manners. Firstly, a full hardware redundancy can be used.

This means that there are two or more sets of hardware doing the same job and their outputs are compared or voted. This approach is e.g. used for logic parts of fault tolerant computers, i.e. for the processors. This approach is very efficient in finding faults, but it involves high costs for the double hardware, and is therefore not economically useful in general applications.

Secondly, one set of hardware is used, but it includes some redundant information that can be used for determining that this is a faulty unit. This can be performed by e.g parity or checksums. This is typically used for memories in computers, but is not well suited for logical parts.

The third approach is based on hardware built-in self tests (BIST). A hardware BIST implementation is based on three parts, a test controller, a test pattern generator and an output response analyser. Usually, BIST test are destructive and are thus not possible to use as background tests. BIST tests can only be performed when the present state of the unit to be checked can be waisted, i.e. they can generally only be used when the system is shut down temporarily. Furthermore, the possible tests are determined from the BIST configuration, and modified or part tests, which are not implementet from the start are difficult to implement. Integrating BIST on board level gives excellent fault detection and it can be done using very limited hardware resources. However, in most cases this is not possible to use, since this type of BIST is not supported by many standard components. Generally, BIST has a good observability, but a rather poor controllability for running part tests on a chip. Also, BIST is limited to function within one circuit, and tests for communication between different circuit or replaceable plugin units may be difficult.

In the fourth approach, fault detection is implemented as software self-tests. The processor executes a program that exercises the hardware and reads information from registers and compares with an expected result that is coded into the program. The extra hardware that is needed is very limited. Generally, only the extra memory space for storing the program is needed. However, fault detection of a high quality can be very hard to get, in particular since the development of fault detection soft-ware is extensive, since it has to be specially designed for every circuitry. The number of, and the location of, nodes where the result of the testing can be checked is normally quite limited. The fault location is therefore often difficult to find. Additionally, is it is not possible to locate faults when signals are passed to other replaceable plugin units without special hardware support. Generally, software self-tests are easily controllable, but the observability is normally limited.

Common for all of the above methods are that they normally only check the final result of a test run. Errors consisting of signal delays, are not very likely to be detected by most of the above methods.

Many complex digital systems, such as telephone switches, are sensitive for time delays. In telephone control systems a time delay of 0.2 is easily recognized by the users and is experienced as a severe disturbance. Such systems has thus to operate more or less continously, and shut-down periods available for testing have to be limited to typically less than 20 ms. Fault detection tests, operating as background tests, therefore have to be performed within one of these shut-down periods. The speed demands for such faults detection tests are high, or the test has to be divided into part tests. None of the above mentioned types of fault detection methods are suitable for such applications.

SUMMARY

An object of the present invention is thus to provide digital system devices and a method of performing fault detection in digital systems, which exhibits both an excellent controllability and an excellent observability. A further object of the present invention is to provide digital system devices and a method of performing fault detection in digital systems, which are fast and permitted to be driven as background procedures during normal operation, i.e. is non-destructive.

The above obects are acheived by digital system units according to the attached claims. The digital system units are equipped with a procecssor, comprising processor availablility means, means for setting the logic units to be tested to a predetermined state, means for executing a stimuli generation and means for activating an output response analyser. The output response analyser comprises means for colleting responses from different nodes in the system, and means for creating signatures of the response signals. The system further comprises means for verifying the signatures and means for performing error signalling. A preferred embodiment also comprises means for storing the present state of the processor, during the fault detection test.

A method for performing fault detection is set forth in the attached claims. According to the method, the processor is made available from other ongoing activities, the logic units to be tested are set to a predetermined state, the output response analyser is activated and a stimuli generation is executed. This controllability of the system is thus collected in the processor unit. The output response analyser collects responses of the stimuli and creates signatures of the collected responses. These observability related steps are performed in the output response analyser. Furthermore, the signatures are verified and if a fault is detected, this error is noticed. Preferrably, the present state of the processor is stored prior to the test procedure, and reloaded after the procedure is finished, whereby the original interrupted process can be restarted. Preferably, also the test procedure can be divided into parts, so that each part can be driven separately during different shut-down periods.

BRIEF DESCRIPTION OF THE DRAWINGS

The present invention will easily be understood by the following detailed description of som explanatory embodiments, in connection with the figures, in which.

DETAILED DESCRIPTION

Figure 1:
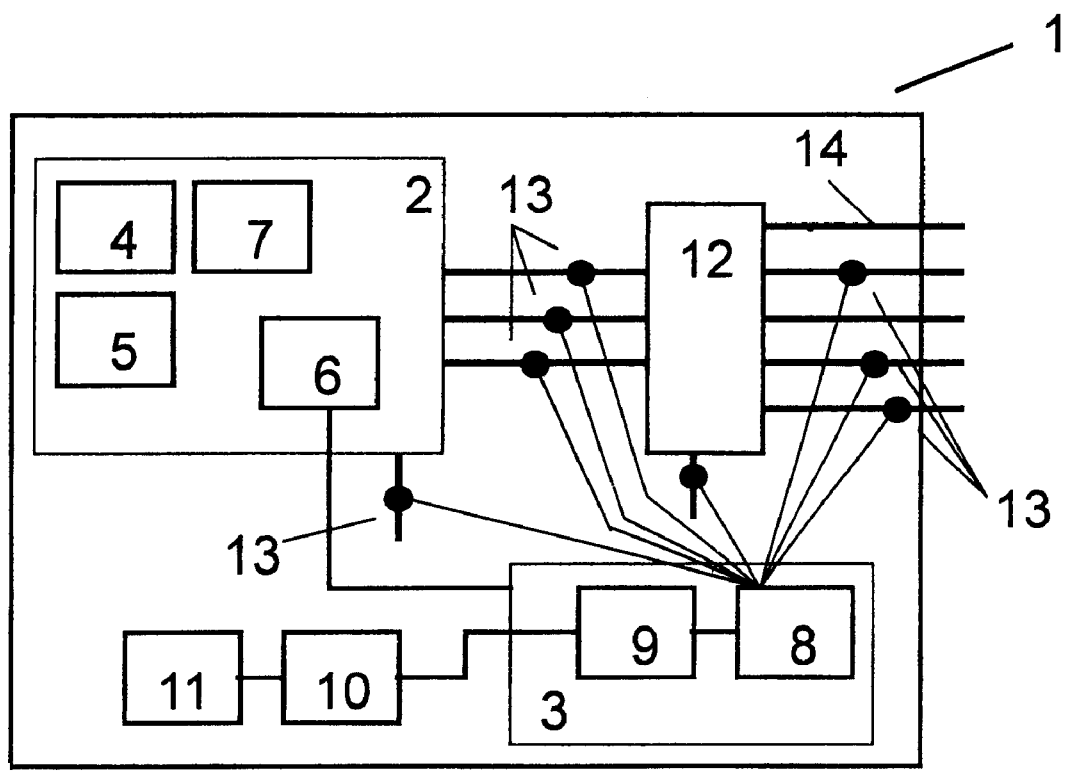
FIG. 1 is a block diagram of the device according to the present invention.

FIG. 1 a block diagram of an embodiment according to the present invention is presented. The numeral 1 denotes generally the digital system unit as a whole. This unit can e.g. be constituted by a chip or a board. The digital system unit 1 comprises a processor unit 2 and an output response analyser 3. The processor unit 2 is normally a processor which is used for the normal operation of the digital system unit 1. The processor unit 2 has a number of output terminals, leading e.g. to other logical elements 12 within the digital system unit 1. From the digital system unit 1 a number of output terminals 14 are present, which connects the digital system unit 1 to other units.

The processor unit 2 comprises, besides specific means for running the normal operation, different means for controlling the fault detection process. The processor unit 2 comprises e.g. activating means 6 for starting or activating the output response analyser 3. This is a control opportunity in order to synchronize the different activities related to the fault detection procedures. Since the fault testing has to be performed by a processor, which is not occupied by other tasks, the processor has to be available, free from other ongoing activities. Thus, the processor unit 2 further comprises processor availability means 4 for ensuring that the processor unit 2 is available for the fault detection process. This processor availability means 4 may interrupt an ongoing activity for making the processor unit 2 available for testing. This has the disadvantage that the interrupted activity is delayed and perhaps has to be run from the beginning once more. A more attractive solution is instead that the processor availability means 4 acts to comprise the fault detection process as one among other activities for the processor unit 2 and let the fault detection follow the same waiting queues etc as other processes. Also this may slow down the execution of important activities somewhat. The most preferrable solution is instead that the processor availability means 4 detects when the processor is out of work, i.e. has shorter inactivity periods. Such a solution will make the fault detection process to a true background procedure. Furthermore, in order to get a well defined testing procedure, the logical units to be tested have to be well controlled in some sense, i.e. set to a predetermined state, from which the actual testing starts. Numeral 5 denotes such a setting means for setting the processor to a predetermined state.

The controllability of the fault testing process according to the present invention is performed by the processor unit 2. Means 7 for executing a stimuli generation is comprised in the processor unit 2. Several different types of fault detection stimuli may be available, and by the processor unit 2 a suitable set of stimuli can be chosen. This means that there is a simple way to have access to different types of fault detection tests, e.g. a full test, part tests, special tests for a specific portion of the digital system unit 1 or tests executable in certain time periods. The execution of the stimuli generation starts a number of more or less complicated procedures within the digital system unit 1 and different signals are output on the different inter- or intra-unit connections.

The output response analyser 3 comprises means for collecting stimuli responses 8 from different nodes 13 in the digital system unit 1. These nodes 13 are located at important and crucial points within the digital system unit 1. For testing the internal behaviour of the unit, collecting nodes 13 are to be located at points exhibiting crucial signals. For testing interunit communications, nodes 13 are placed at the unit output terminals 14. The means for collecting stimuli responses 8 can comprise e.g a multiplexor, enabling reception of stimuli responses from different parts of the chip or board.

In order to acheive a fast handling of the signals, the signals from the nodes 13 are transferred into signatures. Means for creating signatures 9 are therefore comprised in the output response analyser 3. This can be implemented using LFSR (Linear Feedback Shift Registers) units. Example of such device can be found in "Digital Systems Testing and Testable Design" by Ambramovici, Breuer and Friedman, Computer Science Press 1990, pages 445–447. Examples of the procedure of creating signatures may also be found in the same document, pages 432–448, and in references therin. The processes performed by the means for collecting stimuli responses 8 and the means for creating signatures 9 have here been described as taking place in separate means and in separate steps, but someone skilled in the art will recognise that it will be possible also to use one and the same unit and one and the same process for making this.

When the signatures of the stimuli responses of the nodes 13 are created, a verification of these may determine if a fault is present in the digital system unit 1 or not. Means for verifying the signatures 10 are therefore present in the digital system unit 1. When a fault is discovered, means for error signaling 11 are also comprised in the digital system unit 1 in order to e.g. attract the attention of a system operator.

Figure 2:
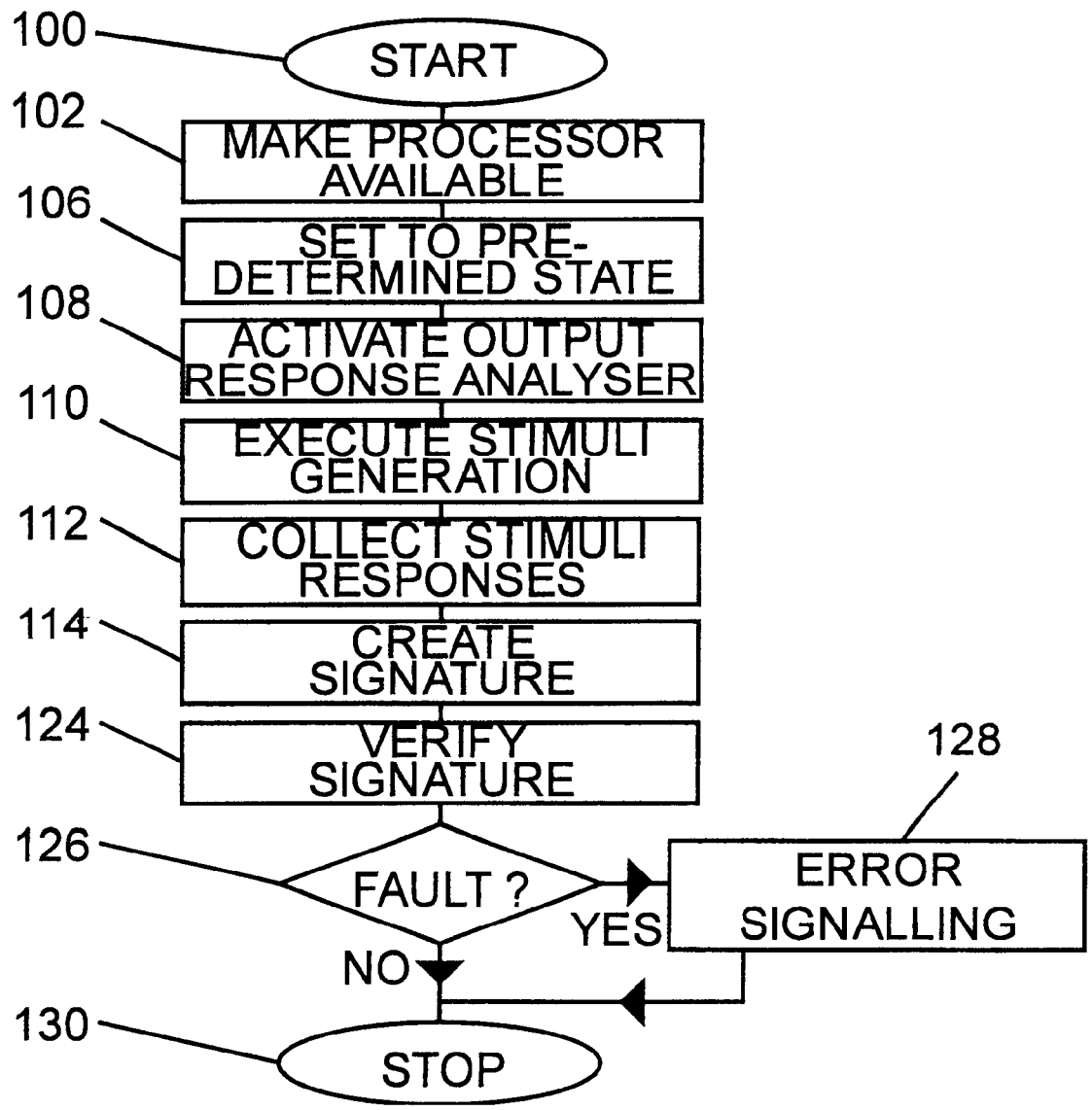
FIG. 2 is a flow diagram representing the method according to the present invention.

FIG. 2 shows a flow diagram, representing an embodiment of the method according to the present invention. The procedure starts in step 100. In step 102, the processor is made available from ongoing activities. As was described above this can be done by interrupting the ongoing processes, placing a job in a queue reserving time for the test or simply waiting for the processor to become available. A storing procedure (described below) has to be employed to be able to recover the original state after completing the test procedure. In step 106, the logical units to be tested are set to predetermined states, which will be the initial states for the fault testing.

The output response analyser is controlled from the processor, and in step 108, the output response analyser is activated. This activation is merely a preparation of the output response analyser that the test responses soon are available. If only a part test is to be run, there may be some nodes which are uninfluenced by the testing and these nodes do not have to be activated, in order to reduce the overall complexity. The output response analyser will from this time sense any state occurring at the selected nodes. In step 110, a stimuli generation is executed in the processor. The stimuli consists generally of any activities which may activate or toggle the logic to be tested. This is normally done by initiating routines for reading or writing in some hardware registers, reading from memories or sending messages. This generation can be one out of a set of different possibilities, testing the whole unit or parts thereof. The stimuli signals are processed in the unit and may produce new states for any numbers of nodes. The responses of the states of the nodes on the stimuli generated by the processor are collected by the activated output response analyser in step 112, and in step 114 a signature representing the node state is created.

When the stimuli generation is finished and the response signals are collected and transferred into signatures, the evaluation starts. The signatures are verified searching for faults in the test procedure. This is normally performed by a processor reading the signature analyser and comparing with a prestored value in the test program. This may be performed by the processor unit 2 or any other available processor in the system. Since only the signatures are available for analysis, the existence of a fault is detected, but the exact occurrence is unknown. In step 126, there is determined if a fault is detected or not. If a fault is detected the procedure proceeds to step 128, where the occurrence of the fault is presented. This error signaling can either take place to some system processor, be presented for an operator or start any other predetermined procedures within the digital system. If no fault is detected, or when the error signaling is finished the procedure proceeds to the end of the procedure 130.

Figure 3:
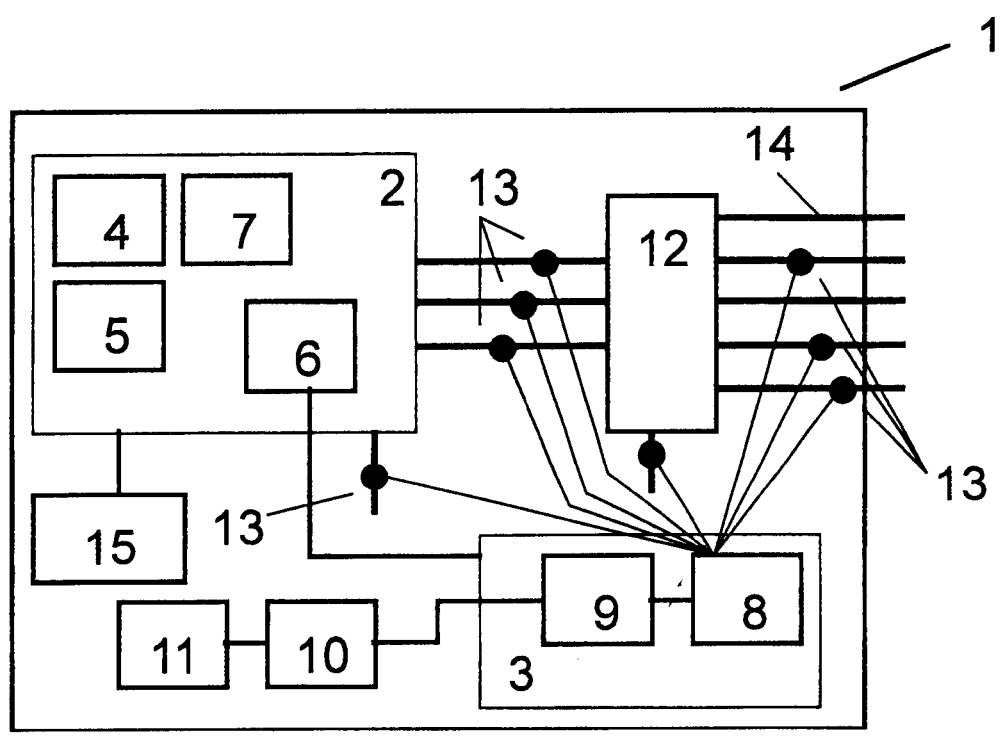
FIG. 3 is a block diagram of a preferred embodiment of the device of the present invention.

Further means of the devices and steps of the methods can be used in order to improve the functions of the fault detection. One often required feature of a fault detection system is the possibility for runnning it as background tests. In e.g. a telephone switching system, only breaks in the continuous operation of in the order of 200 ms are acceptable. These breaks have to be used in many different ways, and in a normal case perhaps 20 ms are available for a background test. The normal activities, then have to continue at the point where they were temporarily interrupted. In FIG. 3, a preferred embodiment of the present invention is shown. Details, which are similar to the earlier described have the same reference numbers and will not be described again. A storage means 15 is here available for storing the state of the processor unit 2 at the point of fault test initiation. This data is, after the completion of the fault detection procedure, recalled in order to recover the processor unit 2 to exactly the same state as before the fault test started.

Figure 4:
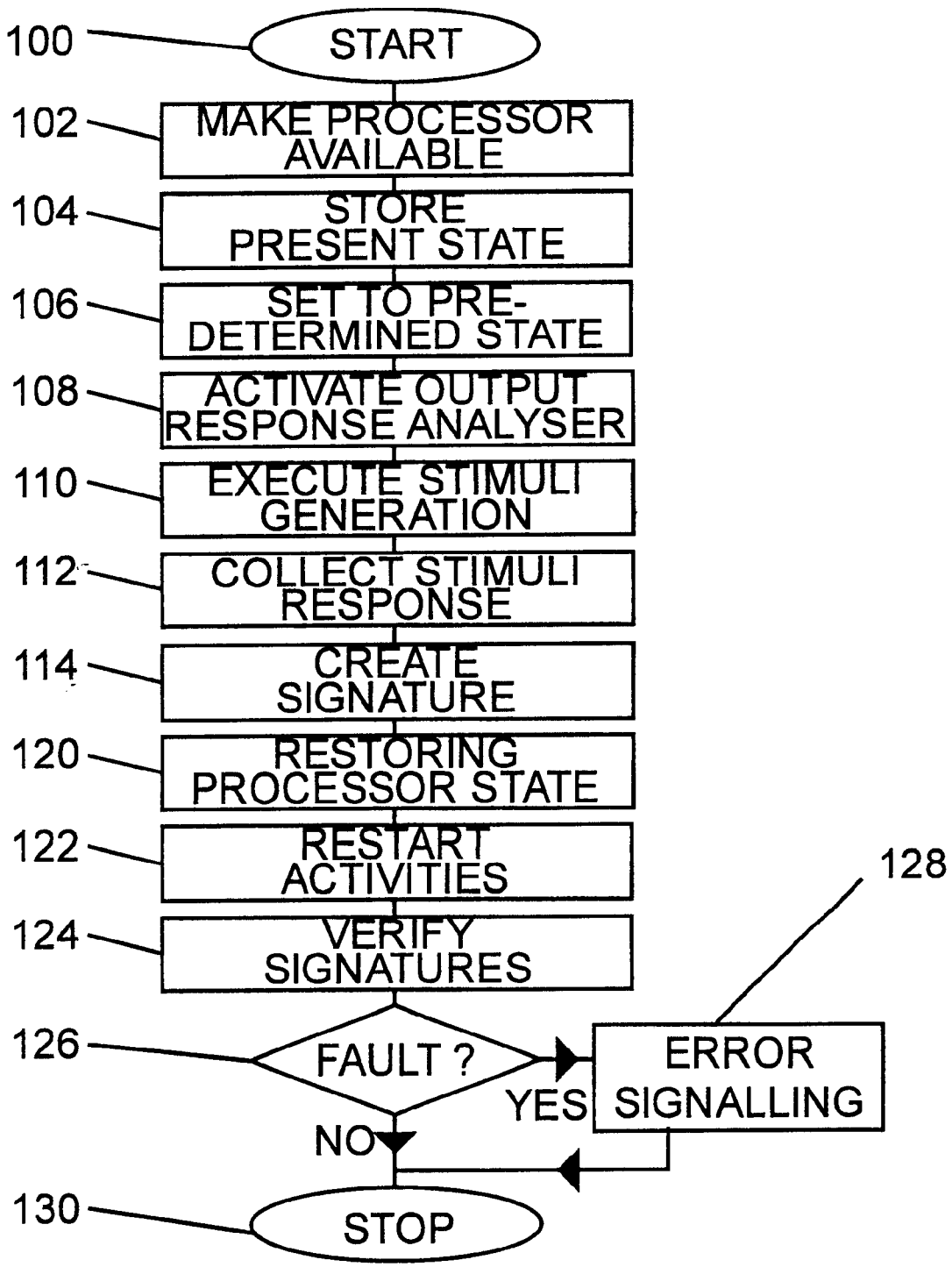
FIG. 4 is a flow diagram representing a preferred embodiment of the method of the present invention.

FIG. 4 shows a flow diagram, which is modified in a corresponding manner. Also here, similar steps have the same reference numbers as in earlier descriptions, and will not be discussed any further. A new step 104 of storing the present processor state is introduced immediately after the availability step 102. The state is then safe during the actual testing procedure. After the signature creation step 114, the recovery of the processor can start. A step 120 of recalling the stored data to restore the previous processor state is introduced, followed by the step 122 of restarting the normal activities of the processor unit 2.

Anyone skilled in the art will understand that these to steps 120 and 122 also can occur at a later stage in the procedure. It is e.g. possible to postpone it until after the signature verification and error signalling. The only necessary condition is that the actual stimuli generation and collection is ended, so that the restarted activities does not interfere with the actual fault detection procedure.

Figure 5:
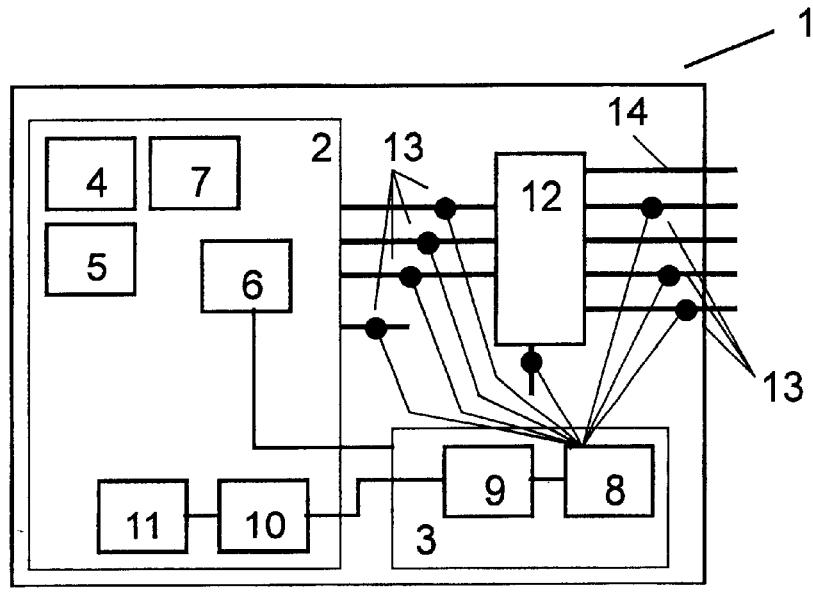
FIG. 5 is a block diagram of another embodiment of the devivce of the present invention.
Figure 6:
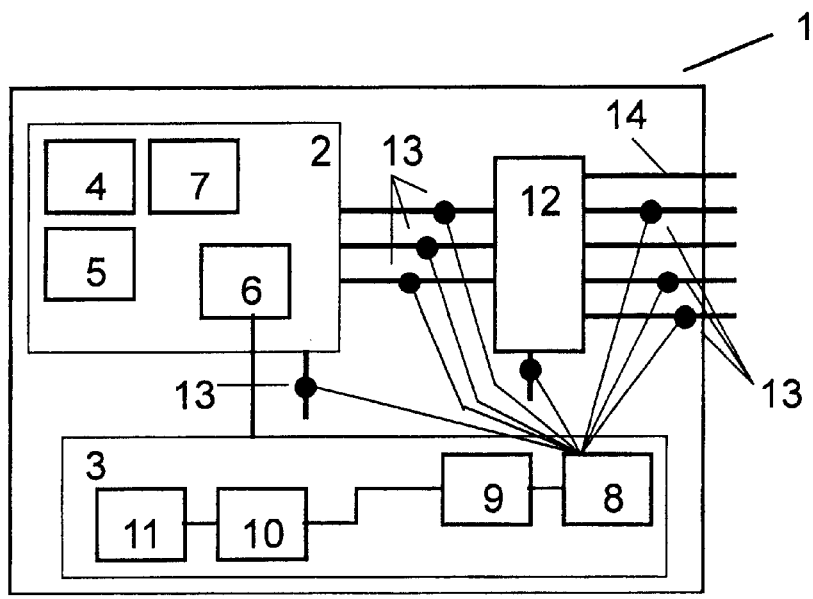
FIG. 6 is a block diagram of yet another embodiment of the devivce of the present invention.

Since the verification of the signatures of the collected response signals can be made separately from the actual collection, the means for performing this step can be placed at different places. In FIG. 1, the verifying means 10 is depicted as separate units withtin the digital system unit 1. The same is true for the means for error signaling 11. In FIG. 5, an alternative configuration is shown, where the verifying means 10 and the means for error signaling 11 constitute parts of the processor unit 2. On the contrary, in FIG. 6, the verifying means 10 and the means for error signaling 11 constitute parts of the output response analyser 3. It is even possible to perform these steps 124, 126, 128 by means situated outside the actual digital system unit 1 itself. This is of particular interest if several units are to be tested together, which is described further below.

The above described embodiments of the present invention have particular advantages compared with the state of the art. The controllability is comprised in the software part of the digital system unit 1. This gives a flexibility in selecting stimuli generation which is appropriate for the present situation. It also gives the possibility to save the present state of the processor, thus enabling background processes. The observability is solved by hardware solutions, which makes it possible to reach nodes, which are impossible to detect by software tests. Furthermore, since signature generation is employed on the response signals, the output response readout can be performed very fast, which makes it possible to use a large number of nodes. The observability may therefore be increased to a larger number of connections. The increased speed of the signature collection gives shorter overall testing periods, which are compatible with the required short available permitted shut-down periods. By using the controllability of the processor unit 2, a full test can be divided into part tests, performed in subsequent shut-down periods, and the length of the shut-down periods may be shortened even more.

Another advantage to separate the controllability and the observability of the fault detection is that any processor can be used together with any output response analyser. Since the only mutual dependence is that the output response analyser has to be activated by the processor, the task of cooperation between these parts is easily solvable.

It is even possible that the stimuli generation does not have to be performed at the same level as the output response analysis. The stimuli generation may e.g. be performed on a board level, while the response analysis is perfomed at a chip level.

Figure 7:
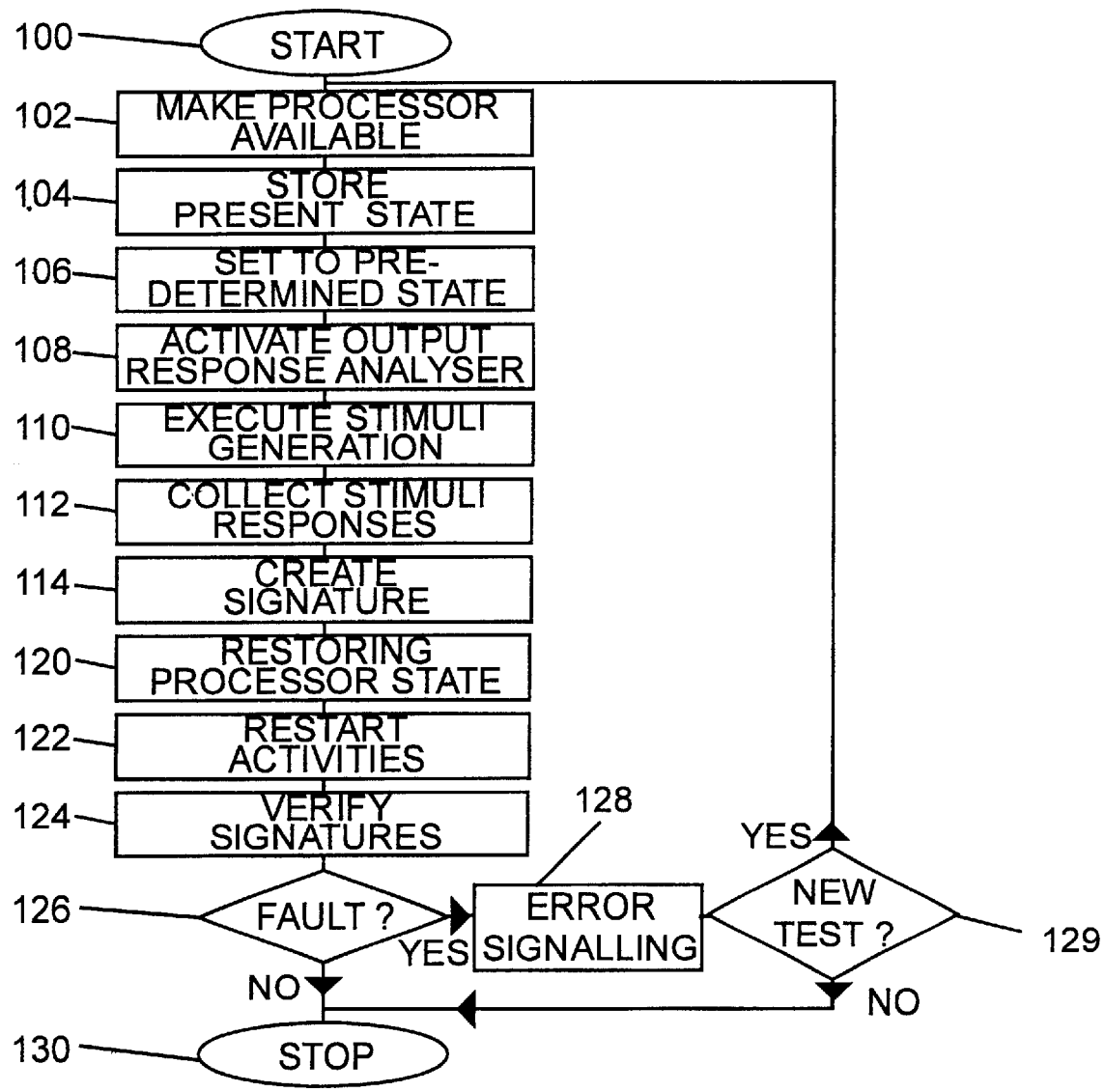
FIG. 7 is a flow diagram of an alternative embodiment of the method according to the present invention.

The flexibility of the controllability is illustrated by the embodiment shown in FIG. 7. The steps of the method is similar to that shown in FIG. 4, similar steps having the same reference numbers. After the detection of the presence of a fault, the controllability of the processor can further be used by introducing a step 129, in which it is decided if there is any other available test which can be used to further locate the detected fault. If a fault is discovered, the operator is alerted in some manner, and is informed about which unit has detected a fault. The normal action taken is to replace the defective unit, to get the system running properly again and in a separate test bench further investigate the exact location of the fault. Normally, it takes some time before the exchange takes place, depending on the availability of spare parts and how closely the operator and the actual devices are placed. In the present invention, when a fault is detected, this waiting time can be used, even if the system still is running to uphold an acceptable service level. If a fault is detected, further fault tests, e.g. on one part of the unit, can be performed, giving the operator further instructions where to look for the error. In step 129, the decision of such a more detailed fault detection is taken and the process returns to step 102 again. The new stimuli generation can now be adjusted to the error situation and other sets of stimuli can be generated, whereby more accurate localizations of the fault can be acheived.

Another possible advantage with the present invention is that also the time aspect of the processing can be an object for fault detection. There are possibilities for faults, only causing delays of signals, instead of incorrect signals. In most cases small delays are acceptable, but in other cases they can be totally untolerable. Fault detection procedures according to the state of the art will normally miss this kind of errors, since only the end result of stimuli signals are recorded and analysed. By the fast collection and signature creation of the present invention, it is possible to acheive a time resolution in fault detection. The collection and signature creation can be performed for each clock pulse, and if a correct signal is missing at one instance, a fault will be detected.

Figure 8:
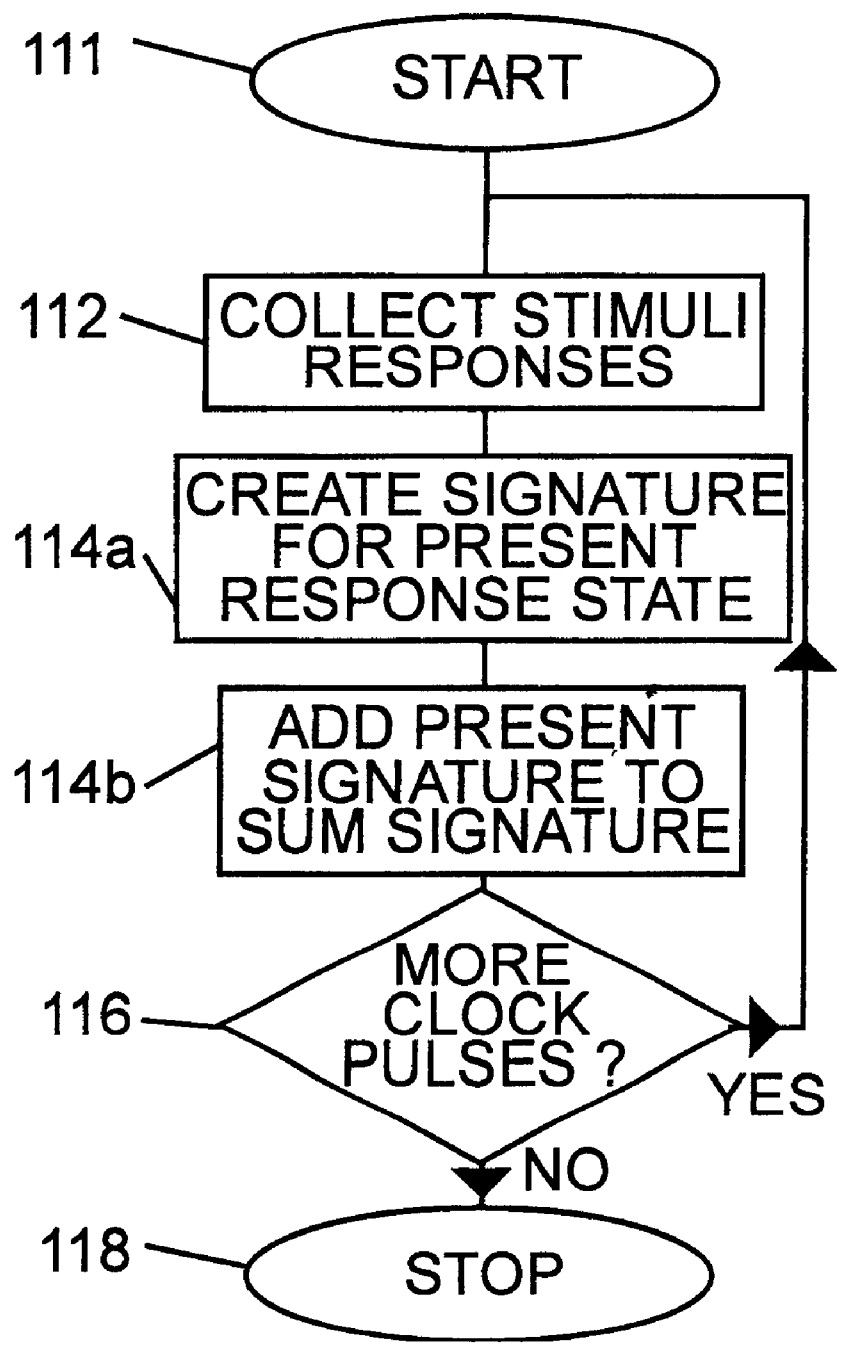
FIG. 8 is a flow diagram of a preferred part process of the method according to the present invention.

FIG. 8 shows a flow diagram of a part process of the fault detection. This part process can replace steps 112 and 114 in the previous described embodiments. The part process starts at 111 and in step 112 the stimuli responses are collected within one clock pulse. In step 114a, a signature for the present response state is created and in step 114b, this present signature is added to a sum signature of previous clock pulses. In step 116, it is decided if there are any remaining clock pulses under which the respopnse collection is to be continued. The part process stop in step 118.

Figure 9:
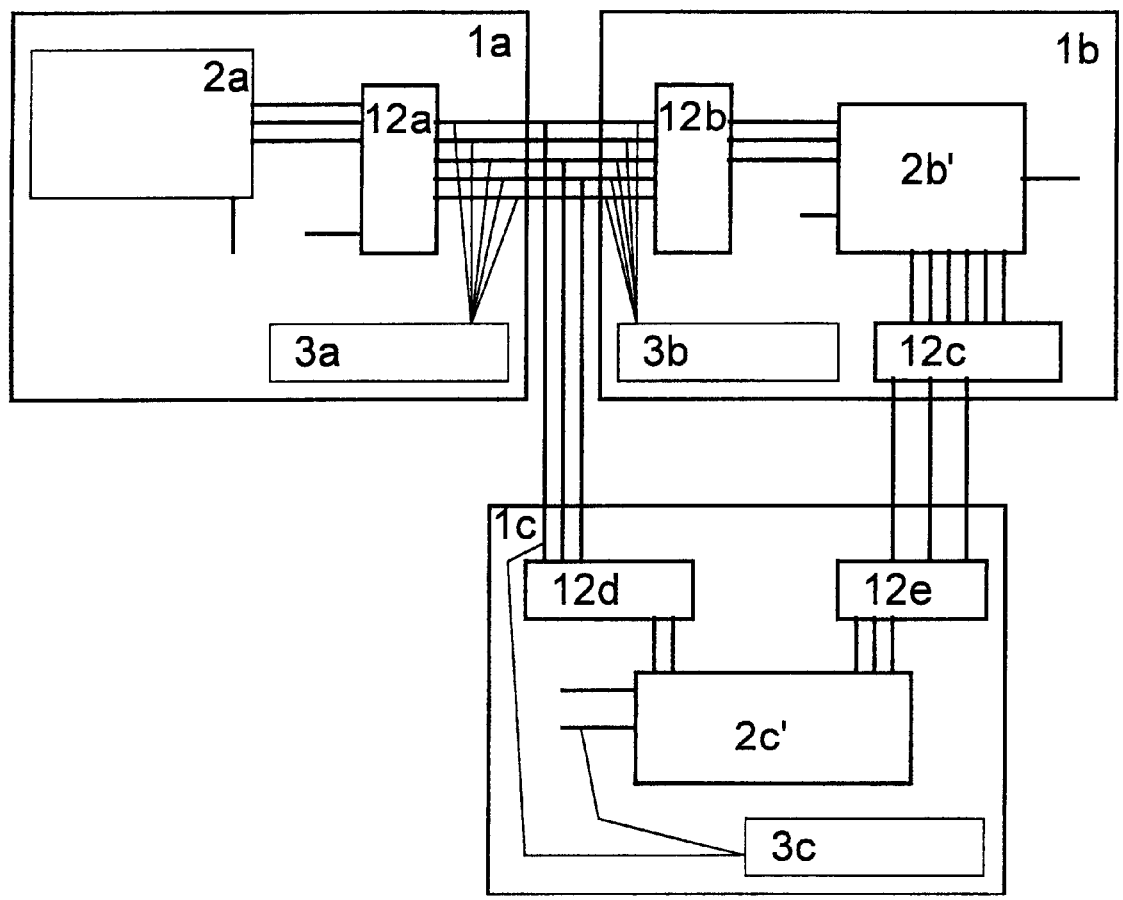
FIG. 9 is a block diagram of a system of several replaceable plugin units equipped for performing the fault detection according to the present invention.

In most fault detection systems of prior art, only fault detection within one unit can be performed. The present invention facilitates fault detections also across the borders of the different units. In FIG. 9, an embodiment of the present invention, with three replaceable plugin units 1a, 1b, and 1c connected to each other, is shown. All units 1a, 1b, and 1c comprises one output response analyser each 3a, 3b, and 3c, respectively. The units 1a, 1b, and 1c also comprises different logical elements 12a–e, and processors 2a, 2b', and 2c'. However, in this particular configuration, only processor unit 2a comprises the means necessary for performing the fault detection procedure according to the present invention. The processors 2b' and 2c' are in this configuration only examples of logical elements which can be tested and are not directly involved in the testing procedure and therefore not necessary to perform the procedure according to the present invention. Alternatively, there is also a possibility to use more than one processor in the testing procedure.

A set of stimuli are generated by the processor unit 2a, giving rise to certain signals on the output terminals of unit 1a. These response signals are collected by the output response analyser 3a. The same signals are communicated to the input of unit 1b, where they are collected and checked by the output response analyser 3b. If output response analyser 3b has a checksum after a test that is erroneous, while output response analyser 3a does not, an error in the connection between unit 1a and 1b can be assumed. In a similar manner, the output response analyser 3c may keep control of the input signals to unit 1c. These input signals can be designed as input stimuli of a fault testing within the unit 1c. The input signals are known and verified to be correct, why an error in the output from e.g. the processor unit 2c' indicates a defective functioning in the processor 2c' or the logical element 12d. In this manner, as long as one output response analyser 3a, 3b, or 3c is present in each unit, the stimuli generation can be performed in any suitable part of the system.

The above described embodiments are only explanatory examples of how the present invention operates in a logical system. Anyone skilled in the art immediately realizes that many modifications and variations can be performed within the scope of the appended claims.

What is claimed is:

1. A digital system unit with fault detection, comprising
a processor unit for use in the normal operation of said digital system unit,
an output response analyser connected to a number of nodes in said digital system unit,
said processor unit comprising
means for ensuring availability of said processor unit for performing of a fault detection process,
means for setting logic units to be tested to a predetermined state,
means for activating said output response analyser and
means for executing a stimuli generation in said processor unit,
said output response analyser comprising
means for collecting stimuli responses from said nodes,
means for creating signatures of said collected stimuli responses,
said digital system unit further comprising
means for verifying said signatures for fault and
means for error signaling.

2. A digital system unit according to claim 1, further comprising storage means for storing of processor state.

3. A digital system unit according to claim 1, wherein said verifying means and error signaling means are comprised in said processor unit.

4. A digital system unit according to claim 1, wherein said verifying means and error signaling means are comprised in said output response analyser.

5. A digital system unit according to claim 1, wherein said digital system unit is an electronics board.

6. A digital system unit according to claim 1, wherein said digital system unit is an electronics chip.

7. A digital system unit according to claim 1, wherein said output response analyser comprises a multiple-input signature register.

8. A digital system with fault detection comprising a number of replaceable plugin units, at least one of said replaceable plugin units comprising a processor unit for use in the normal operation of said replaceable plugin unit, an output response analyser connected to a number of nodes in said respective replaceable plugin unit, said processor unit comprising means for ensuring availability of said processor unit for performing of a fault detection process, means for setting logic units to be tested to a predetermined state, means for activating said output response analyser and means for executing a stimuli generation in said processor unit, said output response analyser comprising means for collecting stimuli responses from said nodes, means for creating signatures of said collected stimuli responses, said replaceable plugin unit further comprising means for verifying said signatures for fault and means for error signaling.

9. A digital system according to claim 8, wherein at least one of said nodes is an input or output terminal for said replaceable plugin unit.

10. A method for fault detection in a digital system comprising a processor unit for use in the normal operation of said digital system, an output response analyser connected to a number of nodes in said digital system, said method comprises the steps of:

making said processor unit available from other ongoing activities for performing of a fault detection process;

setting logical units to be tested to a predetermined state;

activating said output response analyser;

executing a stimuli generation in said processor unit;

collecting, in said output response analyser, stimuli responses from said nodes;

creating signatures of said collected stimuli responses in said output response analyser;

verifying said signatures for faults; and if any fault is detected in said signatures, error signaling.

11. A method for fault detection according to claim 10, comprising the further steps of:

storing the present state of said processor unit in a storage means, prior to said step of setting logical units to be tested to a predetermined state; and restoring the processor state from said stored state, after said signature creating step; and restart said other ongoing activities in said processor unit.

12. A method for fault detection according to claim 10, wherein the signature creating step comprises the step of compressing said output response into signature by using cyclic redundancy checking.

13. A method for fault detection according to claim 10, wherein said verifying and error signaling steps are performed by said processor unit.

14. A method for fault detection according to claim 10, wherein said verifying and error signaling steps are performed by said output response analyser.

15. A method for fault detection according to claim 14, wherein said verifying step comprises the step of comparing said signature with a checksum stored at each replaceable plugin unit.

16. A method for fault detection according to claim 10, wherein said executing step consists of executing a limited stimuli generation in said processor involving only a part of said nodes.

17. A method for fault detection according to claim 10, wherein said executing and collecting steps takes place during more than one clock cycle.

18. A method for fault detection according to claim 17, wherein said collecting step comprises the step of adding signatures of subsequent clock cycles.

19. A method for fault detection according to claim 10, wherein said executing and collecting steps take place at different replaceable plugin units, thereby testing faults in communication between said replaceable plugin units.

* * * * *